June 18, 1963  W. D. LANDGRAF  3,094,204
UNIVERSAL SPOOLS
Filed Nov. 3, 1961  2 Sheets-Sheet 1
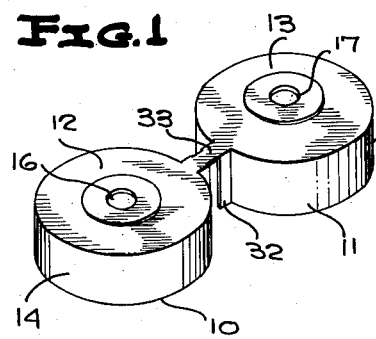
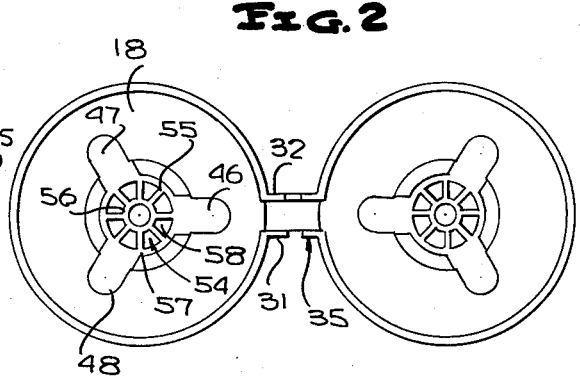
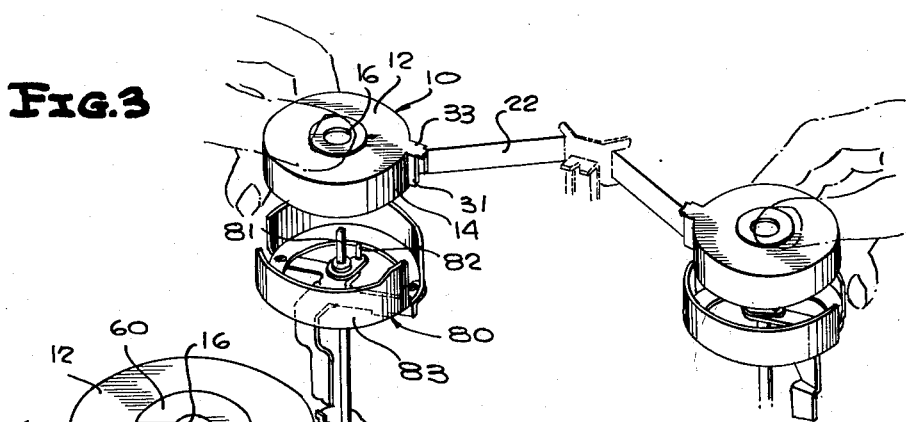
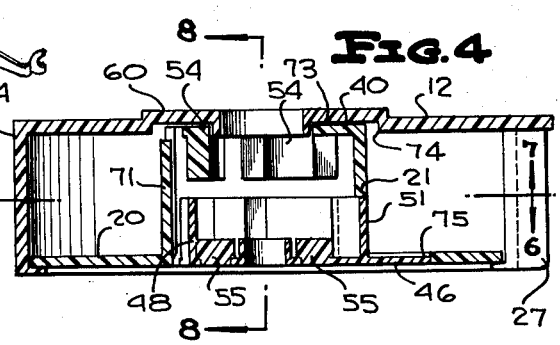
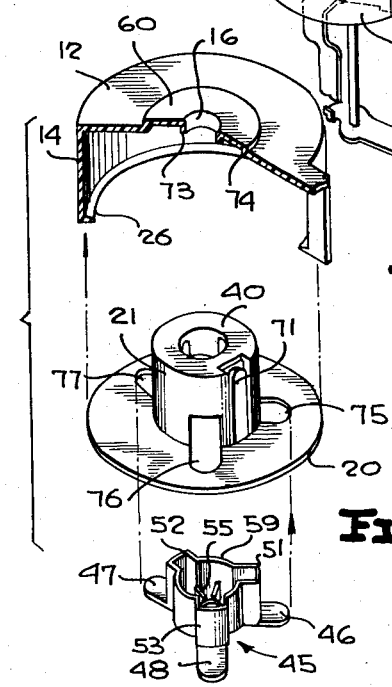
INVENTOR
WALTER D. LANDGRAF
BY *Hurvitz and Rose*
ATTORNEYS June 18, 1963 W. D. LANDGRAF 3,094,204
UNIVERSAL SPOOLS Filed Nov. 3, 1961 2 Sheets-Sheet 2

INVENTOR
WALTER D. LANDGRAF
BY *Hurwitz and Rose*
ATTORNEYS

3,094,204
UNIVERSAL SPOOLS
Walter D. Landgraf, 4808 W. 96th Place, Oak Lawn, Ill.
Filed Nov. 3, 1961, Ser. No. 150,073
10 Claims. (Cl. 197—151)

The present application is a continuation-in-part of Serial No. 30,562 now U.S. Patent 3,008,561 entitled "Typewriter Spools," filed May 20, 1960, and of Serial No. 40,249 now U.S. Patent 3,045,800 entitled "Universal Typewriter Spool," filed July 1, 1960, of which I am the inventor.

The present invention relates generally to cartridges for inked printing ribbons and more particularly to a universal cartridge having an adapter with a plurality of ribbed arms and a plurality of radially extending slots which a ribbon driving mechanism engages.

In Serial No. 40,249, there is disclosed a universal typewriter ribbon spool cartridge, comprised of a pair of cups joined together by a breakable bridge. A spool is provided for each cup. Each of the spools is adapted to be driven by a typewriter driving mechanism after the bridge has been punctured. Each cup includes a base and cylindrical wall extending at right angles to the base as well as a flanged hub co-axial with the cylindrical wall but interior thereof. The flange on the hub is positioned parallel to the cup base by a rim extending perpendicular to the cylindrical walls of the cup.

For utilization with certain types of typewriter driving mechanisms, an adapter having a plurality of arms extending from the hub axis is provided, said arms engaging slots in the flange when the adapter is in utilization. To permit the spools to be employed with other types of driving mechanisms, a plurality of arcuate arms are secured to a surface of the hub parallel to the flange and extend from the surface towards the hub flange. When the latter type of driving mechanism is employed, the adapter is removed and a radially extending lug of the driving mechanism fits between the arcuate members. The lug together with a shoulder on the hub it engages causes rotation of the spool with the typewriter driving mechanism. The former type of driving mechanism includes a pair of vertically extending shafts, one coaxial with the hub axis and one off center from the hub axis. The shafts engage circular apertures which are located in a disc mounted on the removable adapter at right angles to the hub.

Each hub of the prior device is secured rotatably within its respective cup by the cup flange and a shoulder mounted on the hub cylindrical wall. The remainder of the hub including its top, upon which the arcuate arms are secured project beyond a circular aperture in the cup base.

It has been found in manufacturing the above type of adapter that, because of its small size, it is difficult to remove from the flange and to handle. During handling, the radially extending arms have a tendency to be easily sheared from the cylinder with which they are connected. These disadvantages of the prior adapters are obviated in the device of the present invention by employing ribs on the radially extending arms of the adapters. The ribs are integral with and extend axially of an adapter cylinder which is coaxial with the spool hub. Slots are provided in the hub cylinder side walls for receiving the ribs.

It has also been found that the previous adapter frequently does not fit many existing typewriter drive mechanisms for which it is designed because the vertically extending off center driving rod is frequently out of alignment. Thus the off center rod of the driving mechanism and the aperture are located at different radial positions relative to the vertical center driving rod to often render the spool useless for this kind of typewriter. In the present invention, the circular apertures are replaced by a plurality of radially extending slots which are flared from the central axis of the adapter. The ribbon spool, taken both with and without its adapter is thus suitable for use in most commonly commercial sold typewriters.

It has been found that the prior arrangement of inserting the hub in the cover is not satisfactory because the hub top frequently mates poorly with the aperture in the cover base. This defect is obviated in the present device by decreasing the base aperture radius and removing the hub shoulder. The hub height is equal to the length of the cylindrical wall, as before, but the added inner portion of the base is slightly removed from the remainder of the base. The added base portion and the remainder of the base are connected together by a wall coaxial with the cylinder wall and of slightly greater diameter than the hub. The additional base wall is slightly removed from the remainder for facile hub insertion.

Thus, structures, according to the present invention, can be fabricated of three moldable elements: (1) the two joined cups, (2) the spools, which are duplicates, and (3) the adapter for the spools, which are duplicates. The device is therefore economical of fabrication, while the spool elements perform multiple functions, i.e. they include cover plates for the cups, spools for the ribbons, driven elements and fittings to hold the adapters.

It is accordingly an object of the present invention to provide a novel double cartridge winding ribbon.

It is another object of the present invention to provide a novel cartridge system for inked ribbons, wherein each cartridge is composed of basic elements, i.e. a cup element and a spool element the latter including a unitary construction having a flange acting as a cover plate, a ribbon hub and an adapter which is easily removable from the flange and not subject to breakage in hadling.

It is another object of the invention to provide a new and improved system of inked ribbon cartridges, each composed of a cup and a spool, the cups being joined by a bridge the walls of which are designed to be placed into ribbon wells of a variety of typewriters without having to change the shape of the wells.

It is another object of the invention to provide a novel two piece ribbon cartridge, including a cup having an inwardly protruding rim and a spool having a flange acting as a cover for the cup engaging the underside of the rib at the flange edge, wherein provision is made for engaging the spool with a variety of ribbon drive mechanisms.

It is another object of the prseent invention to provide a novel ribbon spool, having provision for retaining an adapter whereby the spool may be adapted to engage the actuating mechanisms of typewriters of substantially all commercial types, some by virtue of the adapter configuration and others by virtue of the configuration of the hub of the spool, exclusive of the adapter.

It is still a further object of the present invention to provide an adapter for universal typewriter spools, wherein the adapter is easily removed from the spool which it normally engages and is not subject to breakage during handling.

It is a further object of the present invention to provide a new and improved typewriter spool adapter which engages that class of typewriter drive mechanisms having a pair of vertically extending driving elements, even those driving mechanisms having out-of-place rods.

The above and still further objects, features and advantages of the present invention will become apparent upon consideration of the following detailed description of one specific embodiment thereof, especially when taken in conjunction with the accompanying drawings, wherein:

FIGURE 1 is a view in perspective of a typewriter ribbon double cartridge, according to the present invention;

FIGURE 2 is a plane view as seen from the underside, of a cartridge according to the present invention;

FIGURE 3 is a view in perspective of a double cartridge according to FIGURE 1 in the process of being mounted on a typewriter;

FIGURE 4 is a view in section of one cartridge of the typewriter ribbon double cartridge;

FIGURE 5 is an exploded view in perspective of a single cartridge, according to the present invention;

Figure 6:
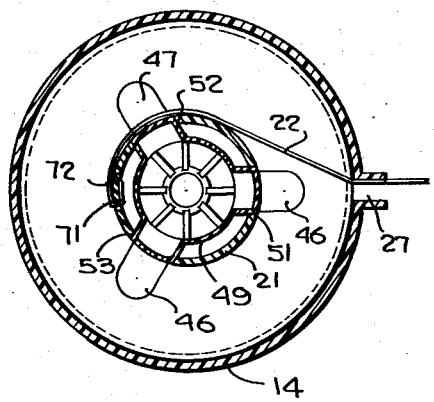
FIGURE 6 is a view in section taken on lines 6—6 of FIGURE 4.

Referring now to the drawings, the reference numeral 10 denotes one cup and the reference numeral 11 another cup of a twin ribbon cartridge. Each of the cups 10 and 11 includes a base 12 and 13 and further the cups include cylindrical walls 14 and 15 and axially located circular openings 16 and 17 in the respective bases 12 and 13. Substantially identical spool elements 18 are provided for cups 10 and 11, so the description of one spool element will suffice for both.

The spool elements 18 include disc shaped flanges 20 acting as cover plates for the cups 10 and 11. The flanges 20 have slightly smaller diameters than the inner diameters of the cylindrical walls 14 and 15 and hence fit snugly but rotatably therein. Extending centrally from each flange is a hollow hub 21 on which may be wound a ribbon 22. To secure ribbon 22 to the hub 21, finger 71 is provided. Finger 71 is integral with flange 20 and extends at right angles therefrom between a pair of axial or longitudinal slots provided in the outer wall of hub 21. The ribbon has a loop 72 at both of its ends, said loop being of such size as to slip over finger 71 between the finger and the walls of hub 21.

To maintain spool 18 containing hub 21 and flange 20 in place, a rim 26 is provided at the end of cylindrical wall 14 opposite base 12. Spool 18 is easily inserted within the cover plate formed by base 12 and cylindrical wall 14 since both the spool and cover plate are fabricated from bendable plastic and an axial slot is provided on cylinder 14.

The inner portion 80 of base 12 is slightly raised to permit the top of hub 21 to fit between the thus formed circular lips 73 and 74, located at different radial distances from the central axis of cylinder 14. Thus by means of lip 26 and the upraised portion 80 of base 12, translatory movement between spool 18 and the cover plate including base 12 and cylindrical wall 14 is obviated.

Three slots 75, 76 and 77 are provided in hub 21 and flange 20 for receiving adapter 45, FIGURE 5. Slots 75–77 extend axially along hub 21 and radially along flange 20 to permit the three radially extending arms 46, 47 and 48 to fit therein. Slots 75–77, as well as arms 46–48, intersect the central axis of hub 21 at equal angles. Adapter 45 includes a cylindrical wall 49 integral with fingers 46–48 and extending coaxially with hub 21. As part of cylindrical wall 49 ribs 51–53 are provided. Each of the ribs extends for the complete height of the cylindrical wall 49 and extends radially from the axis thereof on the fingers 46–48, respectively. The bottom of adapter 45 in addition to including fingers 46–48 comprises disc 54, FIGURE 2, having a plurality of equally spaced spokes 55, extending between the inner circle 56 and outer circle 57. Thus there are formed a plurality of radially extending slots 58, said slots being flared from the adapter axis outwardly.

Figure 8:
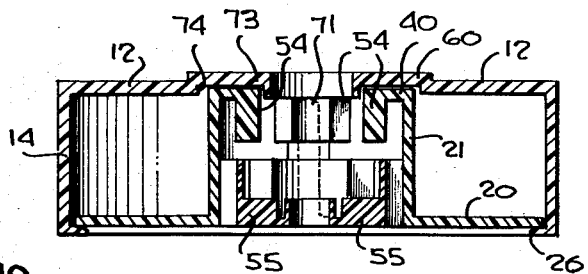
FIGURE 8 is a side sectional view taken along the lines 8—8 of FIGURE 4.
Figure 10:
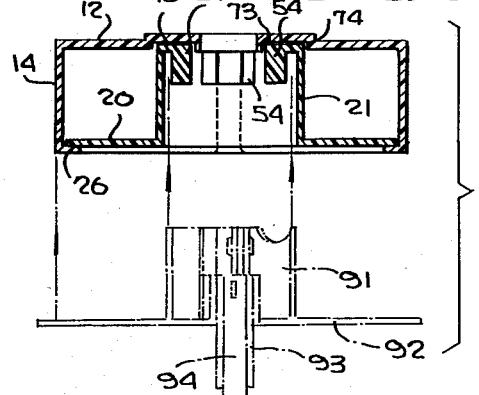
FIGURE 10 is a view in section taken along the lines 10—10 of FIGURE 9.

At the top of each hub 21 remote from flange 20 an annular base disc 40, FIGURES 4, 8 and 10, is provided. At the end of disc 40 and at a radial distance less than hub 21, is provided three vertically extending arcuate members 54, 55 and 56, said arcuate elements extending from base 40 towards flange 20. When adapter 45 is inserted in flange 20, the exterior surfaces, that is those most radially distant from the adapter axis of ribs 51, 52 and 53 coincide in position with the surface of arcuate members 54, 55 and 56 most radial from the axis of hub 21.

Opposed axial slots 27 are provided in cylindrical walls 14 and 15 of cups 10 and 11, respectively, to permit movement of a ribbon into and out of the cups. As noted supra, the slots 27 have the added effect of imparting resilience to the cylindrical walls 14 and 15 permitting some spread when flanges 20 are forced into place, and this resilience in turn maintains a close fit of the flanges 20 within the cups. In a vertical sense the bases 12 and 13 of the cups have sufficient resilience to maintain contact of the edges of the flanges 20 against the underside of rims 26.

The cups 10 and 11 are joined by two parallel webs 31 and 32 joined by a base 33 to form a bridge 35 between the cups and also to provide a shield for that portion of ribbon 22 which extends between the cups via openings 27. Openings 34 are provided in webs 31 and 32 and base 33, to permit observation of the ribbon as well as to establish color or type and also to facilitate of cutting of the bridge.

The cartridge pairs are sold in bridged (or joined) relation. When the purchaser desires to install the ribbon in the typewriter, the bridge 35 is cut as by scissors or other sharp instruments at base 33 and the cups 10 and 11 separated. The cups are installed in the typewriter with the bases 12 and 13 upwardly and the cover plates 20 are provided with adapters 45 and arcuate members 54, 55 and 56 which engage different kinds of driving mechanisms of different typewriters. As either adapter 45 or arcuate members 54–56 rotates in response to typewriter key actuation, the cover plates of flanges 20 are rotated and spools 21 follow in the usual fashion.

With adapter 45 in place, a typewriter of the type illustrated in FIGURE 3 is employed for driving the spools 21 and the ribbon 20 extending therebetween. The ribbon driving mechanism illustrated in FIGURE 3 is of a conventional type having a pair of vertically extending rods 81 and 82. Rod 81 is centrally located within the ribbon driving mechanism 80 while rod 82 is radially removed from rod 81 and is rotated therewith. The adapter annulus 56 of disc 54 includes a circular aperture designed to engage rod 81 when the adapter and hub 21 to which it is secured are located in ribbon driving mechanism 80. The radially extending flared slots 58 formed by spokes 55 between inner and outer annuli 56 and 57 are adapted to engage rod 82. The flared slots 58 are provided between annular discs 56 and 57 to compensate for any transverse movement of rods 81 and 82 relative to the cylindrical walls 83 of typewriter driving mechanism 80, said walls 83 being employed to retain cup 10 in place. With the spool in place, rod 81 extends through aperture 16 in base 12 to insure proper alignment and insertion.

Figure 7:
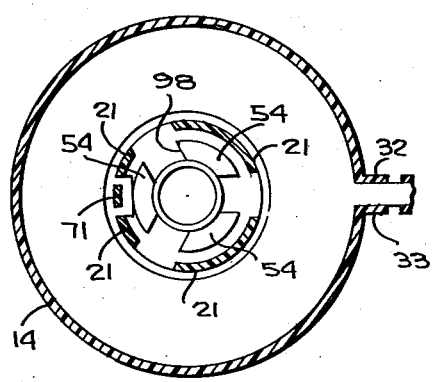
FIGURE 7 is a view in section taken on lines 7—7 of FIGURE 4.
Figure 9:
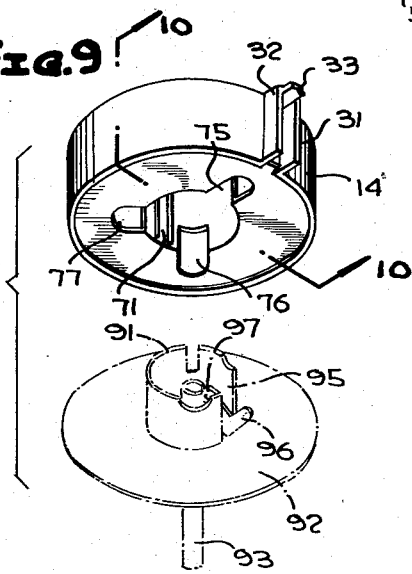
FIGURE 9 is an exploded view of a cartridge in relation to a spool drive mechanism.

FIGURES 9 and 10 illustrate the manner in which the present invention is utilized with a different type of typewriter driving mechanism. With such a mechanism, adapter 45 is removed so that ingress and egress of typewriter driving cylinder 91 is possible within the interior of cylinder 21. Cylinder 91 is mounted on flange 92 which carries sleeve 93 which can ride up and down on driving shaft 94. Cylinder 91 includes a longitudinally extending slot 95 through which lug 96 extends. Lug 96 is fixedly mounted on cylinder 91 by a shoulder 97 extending from cylinder 91 to the end of the lug interior of the cylinder. When the spool is inserted on the typewriter driving mechanism including flange 92 and cylinder 91, radially extending edge 98, FIGURE 7, of one of the arcuate members 54, 55, and 56 engages shoulder 97. Accordingly as flange 92 is rotated in response to rotation of shaft 94, shoulder 97 imparts rotation to radially extending edge 98 of arcuate members 54–56 and hub 21 is rotated.

While I have described and illustrated one specific embodiment of my invention, it will be clear that variations of the details of construction which are specifically illustrated and described may be resorted to without departing from the true spirit and scope of the invention as defined in the appended claims.

I claim:

1. An adapter for ribbon spools carried by rotatable driving elements comprising a cylinder having an axially extending wall, means on said cylinder for securing said cylinder to the driving elements, a plurality of radially extending arms secured to said wall and adapted to fit into slots on a flange of said spools, and a rib secured to each of said arms and to said wall.

2. The adapter of claim 1 wherein said arms are equispaced about the central axis of said cylinder.

3. The adapter of claim 1 wherein said means for securing includes a disc secured to and extending at right angles to said wall, said disc including a plurality of rdially extending slots flared from the central axis of said cylinder.

4. A ribbon cartridge, comprising a pair of cups, a bridge joining said cups, each of said cups including a base wall and a cylindrical wall extending from and integral with said base wall, said cylindrical walls of said cups including opposing axial slots for ingress and egress of a ribbon, a spool for each of said cups, each of said spools including a flange acting as a cover for said cup, and means for securing said spools and flanges rotationally with respect to said cups, said bridge including at least two walls between which said ribbon extends in passing between said axial slots, and adapters arranged to be secured to said flanges, said adapters when secured to said flanges having ribs extending at right angles to said flanges, said flanges including recesses mated with said adapters.

5. A spool for a typewriter ribbon, said spool including a hollow hub having a cylindrical wall with axially extending slots, a flange coaxial with and integral with said hub, said flange including a plurality of spaced, radially extending slots, each of said flange slots being contiguous with a different one of said hub slots, said hub having internally thereof a plurality of elements adapted to engage a first type of ribbon driver, and an adapter having arms engageable with the slots of said flange in unrotatable relation therewith, said adapter, when said arms engage said flange slots, including a cylinder coaxial with said hub, said adapter including a separate rib contiguous with each of said arms and extending axially of said cylinder for engaging said hub slots, said adapter including means for engaging a second type of ribbon driver different from said first type of ribbon driver.

6. A spool for a typewriter ribbon, said spool including a hollow hub having a cylindrical wall with axially extending slots, a flange coaxial with and integral with said hub, said flange including a plurality of spaced radially extending slots, each of said flange slots being contiguous with a different one of said hub slots, said hub having internally thereof a plurality of elements adapted to engage a first type of ribbon driver, and an adapter having arms engageable with the slots of said flange in unrotatable relation to said flange, said adapter including a cylinder coaxial with said hub when said arms engage said flange slots, said adapter including a separate rib contiguous with each of said arms and extending axially of said cylinder for engaging said hub slots, said adapter including a disc extending at right angles to said hub, said disc including a plurality of radially extending spokes between which are formed slots, said slots of said disc being flared from the central axis of said hub to engage a second type of ribbon driver different from said first type of ribbon driver.

7. The spool of claim 6 wherein said plurality of elements comprises a plurality of arcuate, axially extending elements located interiorly of said spool, all of said arcuate elements falling on arcs of the same circle and and being circumferentially separated.

8. A ribbon cartridge comprising a pair of cups having parallel axes, a bridge joining said cups, each of said cups including a base wall and a cylindrical wall extending from and integral with said base wall, said cylindrical walls including opposed axial slots for ingress and egress of said ribbon, a spool rotatable within each of said cups, each of said spools including a flange acting as a cover for its cup, said bridge extending in a plane parallel to the axes of said cups, said bridge being severable to leave a protuberance on each cup arranged to prevent predetermined rotations of said cups with respect to the wells of inked printing machines when installed therein, and adapters arranged to be secured to said flanges, each of said adapters including a cylinder coaxial with said hubs and a separate rib contiguous with each of said arms and said cylinder, said flanges including recesses mated with said adapters.

9. The spool of claim 5 wherein said wall includes a pair of longitudinally extending slots for forming a finger to receive a looped end of said ribbon.

10. A spool for a typewriter ribbon, said spool including a hollow hub having a cylindrical wall, said wall including a pair of longitudinally extending slots for forming a finger to receive a looped end of said ribbon, a flange coaxial with and integral with said hub, said flange including a plurality of spaced, radially extending slots, each of said flange slots being contiguous with a different one of said hub slots, said hub having internally thereof a plurality of elements adapted to engage a first type of ribbon driver, and an adapter having arms engageable with the slots of said flange in unrotatable relation therewith, said adapter including means for engaging a second type of ribbon driver different from said first type of ribbon driver.

References Cited in the file of this patent

UNITED STATES PATENTS

| | | |
|---|---|---|
| 2,825,450 | Lambert | Mar. 4, 1958 |
| 2,873,014 | Lambert | Feb. 10, 1959 |
| 2,925,164 | Murphy | Feb. 16, 1960 |